United States Patent Office 2,808,389
Patented Oct. 1, 1957

2,808,389

PROCESS FOR THE PRODUCTION OF FUSIBLE ALCOHOL-MODIFIED MELAMINE RESINS, AND RESULTING PRODUCT

Heinz Fahrenhorst and Friedrich Stimler, Hamburg, Germany, assignors to Reichhold Chemicals, Inc., Detroit, Mich.

No Drawing. Application August 27, 1954, Serial No. 452,724

Claims priority, application Germany August 29, 1953

5 Claims. (Cl. 260—67.6)

The invention relates to a process for the production of fusible alcohol-modified melamine resins and to the resulting product.

Alcohol-modified melamine resins find extensive employment as lacquer synthetic resins. They are generally produced in such a way that at first a relatively low-molecular condensation product is prepared in neutral or slightly alkaline aqueous or aqueous-alcohol solution from melamine and formaldehyde, a product that subsequently is further condensed in an acid condensation phase in alcoholic solution and at such juncture is at the same time partly etherified.

The first condensation carried out in neutral or alkaline medium leads to the A-stage and the second acid condensation leads to the B-stage of the product.

Thus, the course of the melamine-formaldehyde condensation is dependent upon pH similarly to the way in which ureaformaldehyde condensation is, but it differs from the latter for the reason that the further condensation comes about beyond the A-stage in the case of the melamine-formaldehyde condensation in a higher pH range than in the case of the urea resin formation.

An aqueous solution of 1 mol of melamine in 6 mols of 30% formaldehyde adjusted in usual manner to a pH of 8.5 undergoes a distinct decline in pH upon being heated to 80° C. down to about 7.6 in consequence of a disproportioning of formaldehyde to formic acid and methyl alcohol, known as the Cannizzaro reaction, under the action exerted by alkali; after 15 minutes of heating of this solution to 80° the pH value has declined to 7.2; that is to say, conditions of reaction have set in that cause a further condensation in the direction of the B-state. It has been shown in practice that this decline in the pH value in the course of the prior condensation is unessential as a rule, because as a result of it merely a continuous transition to the second, acid condensation phase takes place. Butanol-modified melamine resins produced in this manner are primarily distinguishable by their irreversible hardenability at increased temperatures and therefore they find application chiefly in the production of baking lacquers. This irreversible hardenability is to be regarded as a characteristic property of these known products.

It has now surprisingly enough been found that when the melamine-formaldehyde condensation is conducted in aqueous-alcoholic solution with consequent prevention of the pH decline under a limit value of about 8.5 and ensuing acid condensation to the B-stage a course of reaction is achieved that is obviously of an entirely different kind from what is the case in the processes heretofore known that leave unconsidered the decline in the pH value in the course of the prior condensation. More specifically, in the mode of work claimed according to the invention condensation products are obtained that after the acid post-condensation in aqueous-alcoholic solution differ considerably in their chemical and physical behavior from the products of this kind heretofore known, they differing from them more particularly for the reason that they excel on the one hand because of their ready fusibility or plasticity and on the other hand because of an unusual stability to influences of further condensation or hardening, such as heat and acid. A butanol-modified melamine resin produced according to Example 1 of this application still remains fusibly thermoplastic even when being baked for several hours at 150° C. and in this respect is clearly distinguishable from products of the kind known heretofore that yield hard and unfusible films after an hour's baking at 120°.

It has furthermore been found that the alcohol-modified melamine resins obtainable through the process claimed according to the invention are advantageously distinguishable by special properties of lacquer technique. In particular it was surprising and by no means to be foreseen that products of this kind characterized by a lack of hardening property—combined in known manner with alkyd resins—result in particularly high grade lacquer resins that develop particularly valuable properties in respect of gloss, surface, elasticity and machinability, as a result of which their deficient hardenability turns out to be in no way disadvantageous. These valuable properties in respect of lacquer technique obviously are connected with the characteristic fusibility of these resins, since gloss and surface of a synthetic resin lacquer are decisively influenced by the so-called flowing properties of their components.

It is recognized that from U. S. Patent No. 2,485,059 it has become known that in the so-called prior condensation of melamine and formaldehyde in aqueous solution reaction products are obtained by consistent prevention of the decline in pH below about 8.5 that are distinctive because of their unlimited water solubility and they retain this property even after spraying to a dry powder. However, from the teaching of this patent it was not apparent that this mode of procedure, advantageous for the achievement of an unlimited water solubility of non-modified melamine resins, brings about also in the production of alcohol-modified melamine resins advantageous properties of an entirely different kind that furthermore are first recognizable after a second acid condensation phase. These advantages lie in a characteristic alteration and qualitative improvement of these alcohol-modified melamine resins with respect to lacquer technique and stand in no relation of any kind to the improved water solubility described in the above-mentioned property. Therefore also they could not be derived in any way from it.

The maintenance claimed according to the invention of a pH value of about 8.8 in the course of the prior condensation requires the use of substantially greater quantities of alkali than in the process heretofore described, which merely calls for a certain alkaline pH adjustment prior to the beginning of the condensation. It is not worth recommending that this increased quantity of alkali of the reaction mixture to be added prior to the condensation, because as a result of it initial pH values of about 12 are attained and accordingly the Cannizzaro reaction is particularly promoted and a disproportionately high formaldehyde loss is caused. Therefore it is advisable to undertake the maintenance of a pH value of 8.8–9.0 through continuous addition of alkali during the prior condensation.

Naturally it is also possible in principle to undertake the maintenance of this high pH value during the prior consideration by the use of a suitable buffer mixture.

*Example 1*

750 parts by weight of 36.5% formaldehyde are adjusted with NaOH to a pH value of 12.0, whereupon 570 parts by weight of butanol and 183 parts of melamine are added and brought into solution by heating to 80° C. At this juncture the pH value declines to about 10.0. Dehydrating is then effected with gradual increase in temperature by circulation distillation with return of the butanol, until about half of the water on hand in the deposit is removed. As a result of this the pH value of the solution is maintained at 8.8–9.0 by continuous addition of dilute NaOH solution.

Thereupon the solution is acidified at 90° C. to a pH value of 4.5 to 5.5 and is completely dehydrated by further gradual increase in the temperature in the circulation. After the separated salts have been filtered off a colorless, clear solution of a butanol-modified melamine resin is obtained that distinguishes itself as lacquer resin by the properties mentioned in the descriptive portion of this patent.

*Example 2*

725 parts in weight of 36.5% formaldehyde are adjusted with about 90 parts in weight of trisodium phosphate to a pH of about 9.8–10.0 and 580 parts of butanol and 183 parts of melamine are added. Then by heating to 80° C. the reaction is brought under way and by gradual increase in the temperature about half of the water on hand in the deposit is removed by circulation distillation. During this distillation the pH of the solution drops to about 8.5, but then remains constant. Acidulation and complete dehydration are then conducted as described in Example 1. The reaction product thus obtained shows characteristic properties entirely akin to those obtained according to Example 1.

We claim:

1. A process for the production of fusible alcohol modified melamine resins which consists of (1) initially condensing formaldehyde and melamine in the proportion of at least 6 mols of formaldehyde per mol of melamine by heating said ingredients in an aqueous solution containing a low molecular monohydric aliphatic alcohol and partially dehydrating the solution while maintaining a pH of at least 8.5, (2) etherifying the initial condensation product by acidifying and (3) completely dehydrating the solution with continued application of heat, the alcohol, melamine and formaldehyde constituting the essential reacting ingredients.

2. A process as set forth in claim 1, wherein the alcohol is butanol.

3. A process as set forth in claim 1, wherein the pH in the initial stage is maintained by the continuous addition of dilute caustic alkali solution.

4. A process as set forth in claim 1, wherein a pH of at least 8.8 is maintained during the initial stage.

5. A fusible plastic resin characterized by high stability to influences of further condensing and hardening produced in accordance with claim 1.

References Cited in the file of this patent

UNITED STATES PATENTS

| | | |
|---|---|---|
| 2,574,741 | Hunt et al. | Nov. 13, 1951 |
| 2,681,326 | Christianson | June 15, 1954 |

FOREIGN PATENTS

| | | |
|---|---|---|
| 683,918 | Great Britain | Dec. 10, 1952 |
| 703,426 | Great Britain | Feb. 3, 1954 |